United States Patent [19]
Lehmann et al.

[11] Patent Number: 5,094,163
[45] Date of Patent: Mar. 10, 1992

[54] IMPRESSION CYLINDER OF A ROTOGRAVURE PRESS

[75] Inventors: Rolf Lehmann, Rudolfstetten; Eugen Schnyder, Waltenschwil, both of Switzerland

[73] Assignee: Sulzer Escher Wyss AG, Zurich, Switzerland

[21] Appl. No.: 645,472

[22] Filed: Jan. 24, 1991

[30] Foreign Application Priority Data

Feb. 1, 1990 [CH] Switzerland ............... 319/90

[51] Int. Cl.$^5$ ............................. B41F 9/00
[52] U.S. Cl. ................... 101/153; 101/152; 101/216; 101/489; 101/DIG. 37
[58] Field of Search ........... 101/152, 153, 170, 216, 101/489, 174, 178, 219, DIG. 37

[56] References Cited

U.S. PATENT DOCUMENTS

| | | | |
|---|---|---|---|
| 4,058,877 | 11/1977 | Lehmann | 29/116 AD |
| 4,069,569 | 1/1978 | Meckel et al. | 29/116 AD |
| 4,493,256 | 1/1985 | Hyllberg et al. | 101/216 |
| 4,513,660 | 4/1985 | Brands et al. | 101/219 |
| 4,539,908 | 9/1985 | Spengler | 101/216 |
| 4,909,147 | 3/1990 | George et al. | 101/170 |

FOREIGN PATENT DOCUMENTS

| | | |
|---|---|---|
| 115611 | 8/1984 | European Pat. Off. |
| 2058315 | 6/1971 | Fed. Rep. of Germany |
| 591640 | 9/1977 | Switzerland |
| 671732 | 9/1989 | Switzerland |
| 383630 | 5/1973 | U.S.S.R. ............ 101/DIG. 37 |

Primary Examiner—Edgar S. Burr
Assistant Examiner—Ren Yan

[57] ABSTRACT

Within the impression cylinder of a rotogravure press and within the roll shell thereof there are provided over the width of the impression cylinder a number of layer packages which can be separately supplied with electrical charge in order to apply electrostatic charges to the impression cylinder surface for the purpose of augmenting printing of a material web. By differently controlling segments of the impression cylinder, there can be accommodated different widths of the material web to be processed. In order to concentrate the electric charge at the actually used region of the impression cylinder and for protecting the zones of the impression cylinder which are not currently being used, there are provided internally of the roll jacket, in axial direction thereof, a number of support elements arranged adjacent one another and braced against a central carrier. These support elements are controlled such that only the support elements in those segments, where there is also supplied electrical charge, exert a pressing force. At the end regions of the impression cylinder, there can be provided counter support elements which are only controlled when there is not applied any electrostatic charge at the end regions of the impression cylinder, in other words, when printing a narrower material web. Hence, in this situation no electrical charge is transferred at the not used roll end regions and the impression cylinder is protected against wear and abrasion.

6 Claims, 1 Drawing Sheet

IMPRESSION CYLINDER OF A ROTOGRAVURE PRESS

BACKGROUND OF THE INVENTION

1. Field of the Invention

The present invention relates to a new and improved construction of an impression cylinder or pressing device of a rotogravure press and which is of the type comprising an elastic tubular-shaped roll jacket or shell. At least one pressure or support element supports this elastic tubular-shaped roll shell upon a central carrier or support, and the support element or support elements exert a pressing force in a pressing plane.

2. Discussion of the Background and Material Information

Such type of impression cylinder or pressing device is known to the art, for instance, from Swiss Patent No. 671,732, granted Sept. 29, 1989 and the U.S. Pat. No. 4,058,877, granted Nov. 22, 1977 and serves, for instance, for the printing of wide material webs in a rotogravure press or printing machine. The material web which is to be printed is pressed by means of the impression cylinder or pressing device against a form cylinder. As a result, the ink or coloring material located in the engraving of the form cylinder can be transferred to the material web, for instance, a paper web which is to be printed, a plastic foil or sheet or some other suitable material which is to be printed. Such impression cylinders possess the advantage that they render possible an essentially uniform pressure impingement throughout the width of the roll defining the impression cylinder and afford a relatively faultless printing of wide material webs having a width up to as much as 10 meters. By using a plurality of pressure or support elements equipped with separate infeed of the pressure medium such impression cylinders can be accommodated to different widths of the material webs to be printed.

It is a well known effect in rotogravure presses that because of the adhesion forces and/or the capillary forces the ink does not always completely depart from the depressions in the engraving, resulting in a poorly printed product In order to eliminate this undesired effect, it is known, for instance, from German Patent No. 2,058,315, published June 24, 1971, to electrostatically charge the surface of the impression cylinder or roll. With the aid of the applied electrostatic charge there can be overcome the capillary forces and all of the ink is completely applied to the material web which is to be printed.

An electrostatic charging technique is known to the art in which the electrostatic charge of the impression cylinder is produced by a corona discharge between an electrode arranged at the rear side of the roll at a small spacing therefrom and the surface of the impression cylinder or roll. This electrode produces at the surface of the cylinder or roll an electrostatic charge. This electrostatic charge is distributed throughout the surface of the cylinder or roll and flows off to the material web to be printed and the form cylinder. Since the electrode is arranged above the impression cylinder, this charging technique is sometimes referred to as "top loading" or "top charging".

There are also known to the art charging systems, for instance, from European Patent No. 115,611, published Aug. 15, 1984, wherein the electrostatic charge is applied from the side through the jacket or shell of the impression cylinder onto the surface thereof. The jacket or shell of the impression cylinder internally comprises, first of all, a layer of a highly insulating material onto which there is applied a layer possessing good electrical conductivity. This layer of good electrical conductivity protrudes, at least at one end of the cylinder or roll, beyond a superimposed electrically poorly conductive soft cover or covering of the cylinder or roll jacket or shell. In this charging system, referred to as "side charging" or "side loading", the protruding part of the highly conductive layer is electrically charged from the side throughout the entire width of the cylinder or roll The electric charge is distributed over the poorer conductive covering of the cylinder or roll jacket or shell and the surface thereof is charged This system possesses the advantage that there are not required any external electrodes, and thus, there is dispensed with the use of a component which requires an appreciable amount of maintenance because of contamination or soiling thereof.

With these methods there is frequently the need to print material webs of different widths with the same printing press or machine and with the same impression cylinder or roll. When attempting to print material webs of reduced width this leads to the problem that the surface of the impression cylinder comes into direct contact with the form cylinder at those locations where there is not present any material web, since the same pressing force prevails over the entire width of the impression cylinder. However, at those locations where there is not present any material web the insulating action of the material web is absent. As a result, the electrostatic charge, upon charging the impression cylinder or roll, flows over the entire cylinder width along the path of least resistance, in other words preferably flows to the uncovered location of the impression cylinder or roll. Thus, at that location where the charge is needed for transfer of the ink to the material web, the electrostatic charge is reduced, and consequently, the printing effect is impaired.

Now in order to avoid this drawback, the impression cylinder known from German Patent No. 2,058,315, published June 24, 1971, possesses conductive layers of different lengths which are alternatingly distributed over the circumference of the impression cylinder. These conductive layers can be separately charged In this way it is possible to selectively connect only wider conductive layers or only narrower conductive layers, and thus, the electric charge can be adjusted to the desired width of the material web. What is disadvantageous with this prior art equipment is that, owing to the intermediate spaces between the conductive layers it is not possible to uniformly charge the circumference of the impression cylinder, rather it only can be charged in discreet zones or strips. Consequently, it is not possible to attain any optimum quality of the printed product. Furthermore, ink particles are increasingly transferred at the uncovered surfaces of the impression cylinder from the form cylinder to the surface of the impression cylinder. Hence, this impression cylinder or roll is more rapidly destroyed at those locations by abrasion and by virtue of the solvent contained in the printing ink.

SUMMARY OF THE INVENTION

Therefore, with the foregoing in mind it is a primary object of the present invention to provide an improved impression cylinder or roll for a rotogravure press which is not afflicted with the aforementioned drawbacks and limitations of the prior art.

Another and more specific object of the present invention aims at the provision of a new and improved construction of an impression cylinder or roll of a rotogravure press, by means of which there can be positively and reliably printed material webs of different widths in the same rotogravure press or printing machine while utilizing electrostatic printing techniques and realizing an improved quality of the printed product, without subjecting the impression cylinder or roll, at uncovered surfaces thereof, to rapid wear.

Now in order to implement these and still further objects of the invention, which will become more readily apparent as the description proceeds, the impression cylinder or roll of the present development, among other things, is manifested by the features that the roll jacket or shell comprises a roll jacket or shell cover or covering having modest electrical conductivity and within which there are provided two layer packages or sets or compound layers Each of these at least two layer packages or sets or compound layers comprises an inner electrically insulating layer and a layer having good electrical conductivity. All of the layer packages or sets or compound layers extend throughout the entire circumference of the impression cylinder. At least one layer package extends in axial direction of the impression cylinder only over a portion of the width of such impression cylinder, and the individual layer packages or sets or compound layers can be separately supplied with an electric charge.

Under the expression "good electrical conductivity" or equivalent terminology, as employed herein, there is to be understood an electrical conductivity in the order of magnitude of a metallic conductor or wire. Under the expression "modest electrical conductivity" or equivalent terminology, there is to be understood an electrical conductivity which lies between a metallic conductor and electrical insulators.

It is particularly advantageous if at least one outer layer package is arranged upon an inner layer package, and if this outer layer package extends, in axial direction of the impression cylinder or roll, only over a portion of the width of the adjoining inner layer package. As a result, the respective width of the individual layer packages or sets or compound layers decreases from the inside towards the outside of the impression cylinder in each case in accordance with a successively graduated width of the material web to be processed. However, it is also possible, according to a modification of the invention, for a plurality of layer packages to be arranged adjacent one another, but electrically insulated from one another.

In this respect, it is advantageous to design the charging supply for furnishing the electric charges to the individual layer packages or compound layers such that, for the narrowest width of the material web to be processed only the corresponding narrowest layer package is supplied with an electrical charge. On the other hand, for the next successive larger width of the material web the narrowest layer package and the directly adjoining package of somewhat greater width are simultaneously furnished with an electrical charge. In the case of the third narrowest width of the material web to be processed, then the three uppermost layer packages are furnished with an electrical charge and so forth, until obtaining the maximum width of the material web to be printed, in which case all of the layer packages or compound layers are simultaneously supplied with an electrical charge.

It is particularly advantageous to design the supply or feed means for furnishing pressurized medium to the support elements such that, in each case, only those support elements are furnished with pressurized medium and thus exert a pressing force, which are arranged in each instance beneath the layer package or layer packages which have been supplied with an electrical charge, whereas the outer adjoining support elements are devoid of pressure, that is to say, no pressurized medium is fed thereto.

It is also particularly advantageous to provide counter supports or pressure elements which are effective in the outer zones of the impression cylinder or roll and which act opposite to the pressing direction, so that there can be prevented contact of the impression cylinder with the form cylinder at the region externally of the material web which is to be printed. When processing a material web having a smaller width these counter support or pressure elements exert a counter force and retract the shell or jacket of the impression cylinder away from the form cylinder. On the other hand, when processing the full or maximum width of a material web these counter support or pressure elements are not impinged or supplied with any pressure or pressurized medium.

BRIEF DESCRIPTION OF THE DRAWINGS

A better understanding of the invention will be had by now referring to specific examples of the invention with reference to the drawings, wherein.

Figure 1:
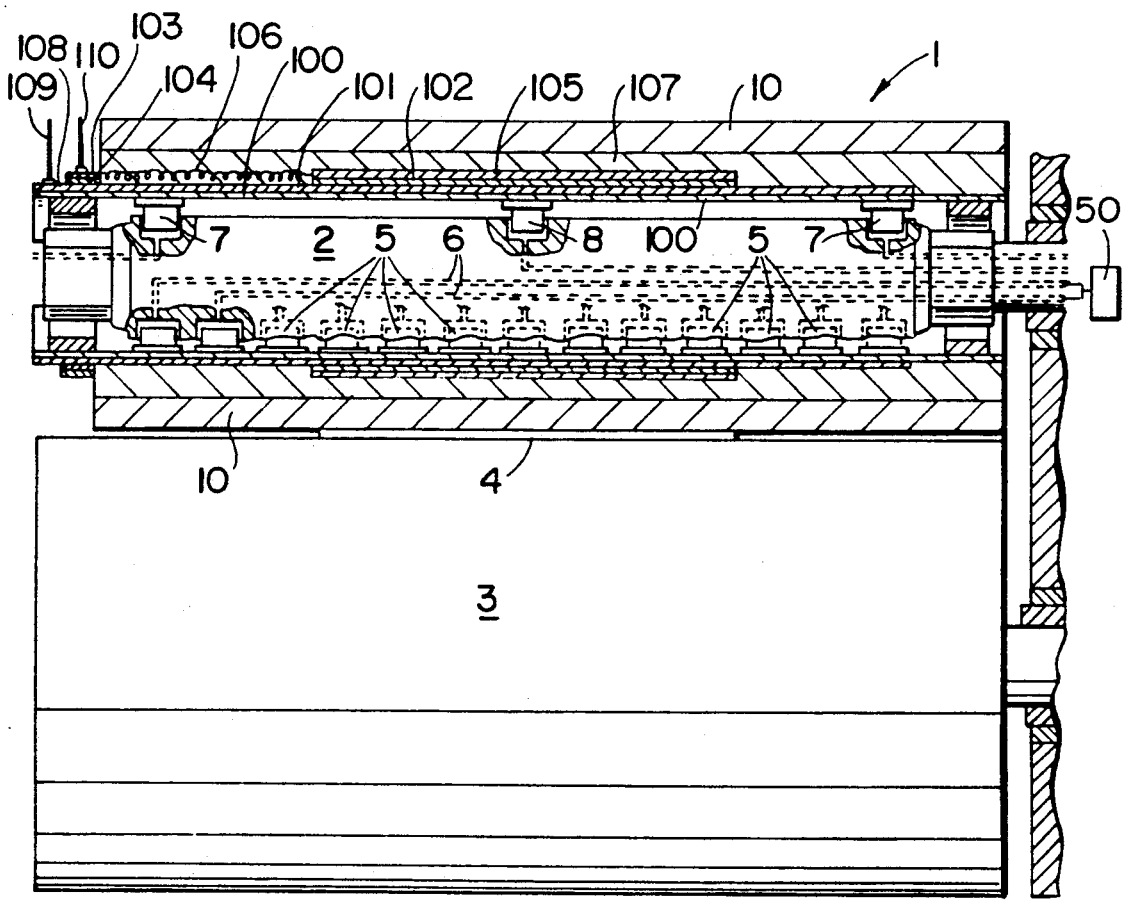
FIG. 1 illustrates a printing press equipped with an impression cylinder or roll, shown in axial section, and with a form cylinder or roll.

DETAILED DESCRIPTION OF THE PREFERRED EMBODIMENTS.

Describing now the drawings, it is to be understood that only enough of the construction of the rotogravure press and the impression cylinder or roll thereof have been shown in the drawings, in order to simplify the illustration thereof, as needed for one skilled in the art to readily understand the underlying principals and concepts of the present development.

Turning attention now to FIG. 1, there has been depicted therein, by way of example and not limitation, an impression cylinder or pressing device, constructed in the form of a controlled deflection roll, and which can be employed, for instance, in a rotogravure press or printing machine. This impression cylinder or roll comprises a roll jacket or shell 1 which is rotatably mounted for rotation about a central stationary carrier or support 2 and can be driven by means of a coacting form cylinder 3. Between the form cylinder 3 and the roll jacket or shell 1, there passes a material web 4 which is to be printed. The width of this material web 4, in the illustrated embodiment, only amounts to about 55% of the maximum possible material web width which can be processed at the rotogravure press.

This roll shell or jacket 1, viewed along its diameter, is built up in layers and viewed along its width is built up in segments. The layers which individually extend over the entire circumstance of the impression cylinder consist of materials of different electrical conductivity, for instance different elastomers. The outermost layer or cover or covering 10 comprises, for instance, a layer or covering formed of rubber, which is approximately 10 to 30 millimeters thick and to which there has been added, in order to achieve a moderate electrical conductivity in the order of magnitude of approximately $10^5$ to $10^7$ ohm.m, a sufficient quantity of graphite or other conductive material. The same holds true for the layer 107 located beneath the layer 10.

The inner layers of the roll jacket or shell 1 are constructed as packages or sets or compound layers. The innermost layer defines the base body which extends over the entire width of the impression cylinder or roll and is in the form of a tube or tubular member 100 having a wall thickness of approximately 1 to 3 millimeters. This tubular member 100, either in its entire structure or at least at its surface having a very high specific resistance exceeding $10^8$, ohm.m.

In particular, this tubular member 100 can be formed, for instance, from a glass fiber-reinforced plastic or a similar suitable material.

Moreover, this tubular member 100 can be either in direct contact with the support or pressure elements 5 or else can be drawn onto a suitable and therefore not particularly illustrated roll shell. Upon this tubular member or tube 100, defining the base body, there is externally mounted on approximately 0.1 to 0.3 millimeter thick highly conductive layer 101 having a specific resistance beneath 10 ohm.m, for instance, formed of copper, silver or graphite.

This layer 101 can be applied in a wound configuration or in a grid-like or surface-like configuration. At one roll end 108 this highly conductive layer 101 lies freely exposed in order to be able to apply thereto an electrical charge which dissipates more or less uniformly by means of the highly conductive layer 101 over the entire width of the impression cylinder or roll.

A further insulating layer 102 having a very high electrical resistance is provided above this innermost layer package or set or compound layer 100, 101 at a given intermediate segment of the impression cylinder. The width of this further electrically insulating layer 102 corresponds approximately to the width of the material web 4 which is to be printed, in the embodiment under discussion, the relatively narrow material web 4. An analogous electrically insulating layer 103 is applied in a ring-shaped form as a segment upon the conductive layer 101 at the cylinder or roll end 108.

Highly electrically conductive layers 105 and 104 are applied to the electrically insulating layers 102 and 103, respectively, and the layer segments or layers 104 and 105 are connected with an electrical conductor, for instance an insulated wire 106. In this way, it is possible to apply an electrical charge at the cylinder or roll end 108 by means of the layer 104 and the infeed wire or conductor 106 to the layer 105.

Figure 2:
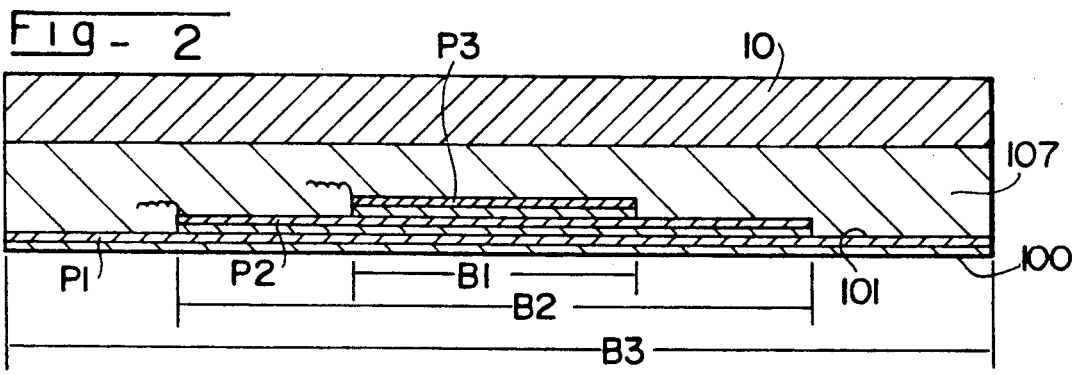
FIG. 2 is a fragmentary detail of the roll jacket or shell of the impression cylinder depicted in FIG. 1.

The number of layer packages or sets or compound layers, each composed of an electrical insulating layer and a highly conductive layer, is chosen such that as far as possible all of the material web widths which are expected to be encountered correspond at least approximately to the width of a segment or layer package. In particular, FIG. 2 depicts in section an arrangement having three layer packages or compound layers or sets P1, P2 and P3. It will be seen that the segment widths B1, B2 and B3 of these three layer packages or sets P1, P2, and P3, respectively, are graduated towards the outside so as to be increasingly narrower or smaller in width, so that it is possible to attain a step-wise accommodation to corresponding material web widths.

Figure 3:
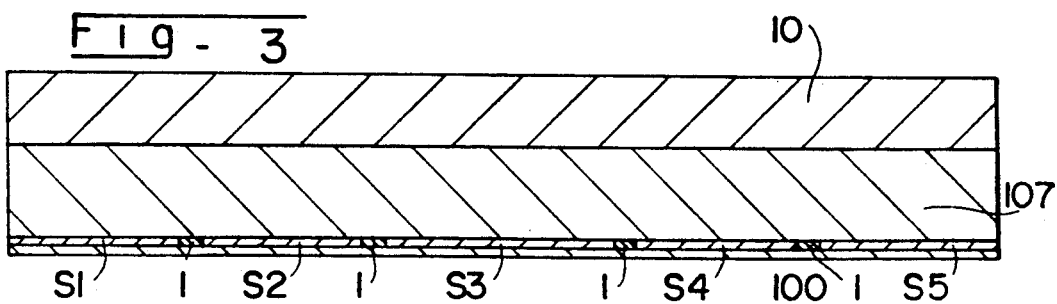
FIG. 3 illustrates a fragmentary detail of a modified construction of roll jacket or shell of an impression cylinder which can be used in the arrangement of FIG. 1.

Instead of the construction just described with reference to FIG. 2, it is possible, as depicted in the modified embodiment of FIG. 3, to arrange the layer packages or sets or compound layers also adjacent one another in axial direction of the impression cylinder or roll, for instance in the form of a number of conductive layers S1, S2, S3, S4, S5 and so forth and which are separated from one another by the electrically insulating intermediate spaces I. It is further remarked that the electrically conductive layers S1 to S5 are arranged upon a common electrically insulating substrate, here defined by the tubular member or tube 100.

Upon these described layer packages or sets, which individually only possess a small layer thickness in the order of magnitude of 1 to 2 millimeters, there are provided one or more of moderate electrically conductive layers 10, 107, the electrical conductivity of which is markedly beneath that of metals. The electrical conductivity of these layers 10, 107 are accommodated to one another such that the layer 107 has a lower electrical conductivity than that of the layer 10, however, the entire electrical conductivity is so great that electrical charges furnished by the highly conductive layers 101 and 105 and so forth, propagate outwardly at the roll jacket or shell up to the surface of the roll jacket, layer or covering 10 and at that location are effective. The layer thickness and material are chosen such that the electrical charge of the highly conductive layers must be uniformly distributed over the entire relevant segment before such electrical charges can flow off via the outer layers and the cover or covering in the direction of the material web 4.

There are advantageously provided separate charging devices or electrical charge supply means 109 and 110 at the roll jacket end 108, so that it is possible to selectively charge only predetermined partial segments of the impression cylinder or roll. If, for instance, all of the electric charging devices 109 and 110 are simultaneously in operation, then, the impression cylinder or roll has furnished thereto electrical charges throughout the entire width of the impression cylinder or roll. On the other hand, if an electrical charge is only supplied by means of the charging device 110, then only the outermost layer package or compound layer 102, 105 and specifically the highly electrically conductive layer 105 thereof is electrically charged. The electrical charge which is thus furnished predominately flows over the width of the layer package 102, 105 in the direction of the material web 4. Since at the laterally merging zones of the layer package 102, 105 the adjacent highly electrically conductive layer joining layer 101 is not electrically charged, there occurs at that location an appreciably reduced outflow of electrical charge through the moderately conductive outer layers 107 and 10 to the uncovered portion of the form cylinder. As a result, there is at least partially attained the desired effect of concentration of the electrical charge at the material web 4. The electrical power or output thus can be approximately reduced to the material web 4 owing to the charge concentration. Additionally, the jacket covering or layer 10, with this mode of operation, is protected against abrasion and wear.

In order to produce the requisite pressing force, it is particularly advantageous to employ, instead of a single support or pressing element which extends over the entire width of the impression cylinder or roll, a number of adjacently arranged support or pressure elements 5, as shown in FIG. 1. Furthermore, this multiplicity of support or pressure element 5 are advantageously impinged separately or in segments or groups with pressure medium, for instance a hydraulic pressure medium, and in the manner disclosed in Swiss Patent No. 591,640, the disclosure of which is incorporated in its entirety herein by reference. Consequently, it is possible to vary the force or pressure pattern in the pressure gap of the rotogravure press, over the width of such pressure gap, such that the pressing force is appreciably reduced at those locations which are not covered by the material of paper web 4 or the like. This also has the beneficial result that it is possible to analogously vary the electrical conductivity and the electrostatic charges are increasingly forced to flow off to the form cylinder at that location where there is present an increased contact pressure.

In order to be able to completely eliminate the contact pressure when operating the impression cylinder or roll with a reduced width of the material web 4 and in order to be able to completely prevent a flow of the electrical charge to the form cylinder 3, it is particularly advantageous to additionally provide at the end regions of the tubular roll jacket or shell 1 support or pressure elements 7 which are effective in a direction opposite to the normal pressing direction. These additional support element 7 are impinged with pressure only when the rotogravure press is processing a material web width of reduced size. When these support elements 7 are impinged with pressurized fluid medium or pressure medium, the roll jacket or shell 1 is retracted at the ends thereof away from the form cylinder 3, and thus, the flow of electrical charge to the roll end is extensively or, in fact, completely suppressed.

Additionally, it is possible to advantageously provide at the central region of the roll shell or jacket 1, a lift-off element or device 8 which, in conjunction with the action of the counter support elements 7, brings about a lift-off of the roll jacket or shell 1 of the impression cylinder from the form cylinder 3 during standstill of the rotogravure press for the purpose of enabling insertion of the paper or other material web 4 which is to be processed.

It is here further indicated that control lines or conduits 6 leading to the individual support or pressure elements 5 can be supplied with pressure or pressurized medium by means of the action of control device 50, at which there is also contacted the electrical charging devices 109 and 110, such that only those support elements 5 have furnished thereto pressure medium for producing the pressing force, which are located in the zone or segments of the impression cylinder, which also have furnished the electrical or electrostatic charge.

By virtue of the herein rendered possible simultaneous segment-wise or zone-wise operation both of the electrostatic charging and also the support elements 5, the electrical charge which is required for obtaining a good quality of the printed material web 4 is optimumly reduced and at the same time there is prevented wear of the segments or sectors of the impression cylinder which are not currently being used.

Although the present invention has been described in some detail by way of illustration and example for purposes of clarity of understanding, it is to be understood that certain changes and modifications may be made within the spirit of the invention.

What is claimed is:

1. An impression cylinder of a rotogravure press, comprising:
    a substantially tubular roll shell;
    a central carrier located within said substantially tubular roll shell;
    at least one support element for supporting said substantially tubular roll shell upon said central carrier;
    said at least one support element exerting a pressing force in a pressing plane;
    said substantially tubular roll shell comprising a roll shell cover possessing moderate electrical conductivity;
    said substantially tubular roll shell further comprising at least two layer packages within said roll shell cover;
    said at least two layer packages each comprising an inner electrically insulating layer and an outer layer having good electrical conductivity;
    at least one layer package of said at least two layer packages extending only over a portion of the width of the impression cylinder;
    means for supplying electrical charges separately to individual layer packages of said at least two layer packages;
    said at least one support element comprising a plurality of adjacently arranged support elements extending in an axial direction over the width of the impression cylinder;
    means for controlling at least predetermined ones of said plurality of support elements independent of one another in order to produce a predetermined pressing force in the pressing plane; and
    said controlling means including means to control said support elements such that only support elements adjacent layer packages which are electrically charged exert a pressing force.

2. The impression cylinder as defined in claim 1, wherein:
    said at least two layer packages define an outer layer package and an inner layer package adjacent said outer layer package;
    each of said outer layer package and said inner layer package having a respective predetermined width; and
    said outer layer package extending only over a portion of the width of the inner layer package so that the predetermined widths of the outer layer package and inner package decrease from the inside toward the outside of the impression cylinder substantially in correspondence with a successively graduated width of material web to be processed.

3. The impressing cylinder as defined in claim 1, wherein:
    said at least two layer packages comprise a plurality of segments being arranged adjacent to one another in an axial direction over the width of the impression cylinder;
    the electrically conductive layers of the plurality of segments of the at least two layer packages being electrically insulated from one another by intermediate insulating spaces.

4. The impression cylinder as defined in claim 3, further including:

a common insulating substrate upon which there are arranged the electrically conductive layers of the at least two layer packages at different segments of the impression cylinders.

5. The impression cylinder as defined in claim 1, wherein:

said impression cylinder has end regions;

additional support elements provided at the end regions of the impression cylinder;

said additional support elements being effective in a direction opposite to the pressing force in the pressing plane; and said additional support elements being controlled such that said additional support elements exert a counter force at the substantially tubular roll shell when layer packages located at end regions of the substantially tubular roll shell fail to have electrical charge supplied thereto.

6. An impression cylinder of a rotogravure press, comprising:

a substantially tubular roll shell;

a central carrier located within said substantially tubular roll shell;

at least one support element for supporting said substantially tubular roll shell upon said central carrier;

said at least one support element exerting a pressing force in a pressing plane;

said substantially tubular roll shell comprising a roll shell cover possessing moderate electrical conductivity;

said substantially tubular roll shell further comprising at least two layer packages within said roll shell cover;

said at least two layer packages each comprising an inner electrically insulating layer and an outer layer having good electrical conductivity;

at least one layer package of said at least two layer packages extending only over a portion of the width of the impression cylinder;

means for supplying electrical charges separately to individual layer packages of said at least two layer packages;

said at least one support element comprises a plurality of support elements;

control line means arranged in said central carrier for feeding pressure medium to said plurality of support elements; and control means for controlling the infeed of pressure medium to said plurality of support elements via said control line means in segmental synchronism with the supply of the electrical charges to associated ones of said layer packages.

* * * * *